United States Patent [19]

Hsieh et al.

[11] Patent Number: 5,401,816

[45] Date of Patent: Mar. 28, 1995

[54] TRANSITION METAL CATALYST, METHOD OF PREPARING CATALYST, POLYMERIZATION PROCESS EMPLOYING CATALYST, AND POLYMER PRODUCED

[75] Inventors: Henry L. Hsieh, Pittsboro, N.C.; Ted M. Pettijohn, Bartlesville, Okla.

[73] Assignee: Phillips Petroleum Company, Bartlesville, Okla.

[21] Appl. No.: 127,717

[22] Filed: Sep. 27, 1993

[51] Int. Cl.$^6$ .............................................. C08F 4/69
[52] U.S. Cl. ............................... 526/114; 502/113; 502/104; 502/107; 526/352; 526/905
[58] Field of Search ............... 502/113, 104, 107; 526/114

[56] References Cited

U.S. PATENT DOCUMENTS

| | | | |
|---|---|---|---|
| 3,379,706 | 4/1968 | Gunther | 526/135 |
| 3,687,920 | 8/1972 | Johnson | 526/130 |
| 3,709,853 | 1/1973 | Karapinka | 526/130 |
| 3,806,500 | 4/1974 | Karol | 526/129 |
| 3,879,368 | 4/1975 | Johnson | 526/113 |
| 4,101,445 | 7/1978 | Levine et al. | 502/154 |
| 4,284,527 | 8/1981 | Pullukat | 502/154 |
| 4,305,841 | 12/1981 | Gutweiler | 502/104 |
| 4,659,685 | 4/1987 | Coleman, III et al. | 502/113 |
| 5,077,255 | 12/1991 | Welborn, Jr. | 502/104 |
| 5,109,084 | 4/1992 | Lee | 526/116 |
| 5,120,696 | 6/1992 | Tsutsui et al. | 502/113 |
| 5,242,876 | 9/1993 | Shamshoum et al. | 502/113 |
| 5,310,834 | 5/1994 | Katzen et al. | 526/114 |

OTHER PUBLICATIONS

FW Billmeyer, Jr., Textbook of Polymer Science, 3d., Wiley, New York, 1984, pp. 91–94.

Primary Examiner—Mark Nagumo
Attorney, Agent, or Firm—Marianne H. Michel

[57] ABSTRACT

A polymerization catalyst system is provided comprising a catalyst and a cocatalyst, wherein the catalyst comprises a chromium compound and a transition metal compound, wherein said chromium compound is a cyclopentadienyl compound, wherein the transition metal compound is a titanium hydrocarbyloxide, and wherein said cocatalyst is an organoaluminum-halide compound. Other aspects of the invention provide a process for preparing the catalyst described above, a polymerization process employing the catalyst, and the polymer produced.

22 Claims, No Drawings

TRANSITION METAL CATALYST, METHOD OF PREPARING CATALYST, POLYMERIZATION PROCESS EMPLOYING CATALYST, AND POLYMER PRODUCED

BACKGROUND OF THE INVENTION

The present invention relates to transition metal catalysts.

In the polymerization of alpha-olefins, it is known to use catalysts comprising a transition metal compound and an organometallic compound. The catalysts described above produce polymers of narrow molecular weight distribution and do not exhibit a multimodal or broad molecular weight distribution.

For many applications, such as extrusion and molding processes, it is highly desirable to have polymers which have a broad molecular weight distribution of the unimodal or the multimodal type. Such polymers evidence excellent processability, i.e., they can be processed at a faster throughput rate with lower energy requirements with reduced melt flow perturbations.

It is also highly desirable to produce multimodal or broad molecular weight distribution polymers directly in a single reactor, without having to blend polymers having different molecular weights in order to obtain the advantages of this invention.

SUMMARY OF THE INVENTION

An object of the present invention is to provide olefin polymerization catalysts capable of producing polymers having broad molecular weight distribution.

Another object of the present invention is to provide a process for preparing such catalysts.

Another object of the present invention is to provide an olefin polymerization process for producing polymers having broad molecular weight distribution in a single reactor.

Another object of the present invention is to provide olefin polymers having improved processability.

A polymerization catalyst system is provided comprising a catalyst and a cocatalyst, wherein the catalyst comprises a chromium compound and a transition metal compound, wherein the chromium compound is a cyclopentadienyl compound, wherein the transition metal compound is a titanium hydrocarbyloxide, and wherein said cocatalyst is an organoaluminum halide compound. Other aspects of the invention provide a process for preparing the catalyst described above, a polymerization process employing the catalyst, and the polymer produced.

DETAILED DESCRIPTION OF THE INVENTION

Suitable chromium compounds are substituted or unsubstituted cyclopentadienyl compounds and are those represented by the general formula

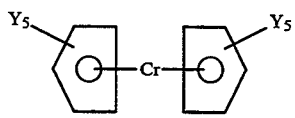

wherein each Y is individually selected from the group consisting of hydrogen or alkyl radicals containing from 1 to 20 carbon atoms, preferably 1 to 10 carbon atoms, and more preferably 1 to 6 carbon atoms. Each Y can be the same or different and can be basically any substituent which does not interfere with the method of the present invention. Examples of suitable alkyl radicals include methyl, ethyl, propyl, butyl, tert-butyl, and cyclohexyl. Bis(cyclopentadienyl)chromium(II) is currently preferred due to availability and excellent results.

The transition metal compound is a hydrocarbyloxide of a transition metal selected from the group consisting of hydrocarbyloxides of titanium, zirconlure, and vanadium, although other transition metals can be employed. Titanium tetrahydrocarbyloxide compounds are the most preferred compounds because they produce excellent results and are readily available. Suitable titanium tetrahydrocarbyloxide compounds include those expressed by the general formula $$Ti(OR)_4$$

wherein each R is individually selected from the group consisting of alkyl, cycloalkyl, aryl, alkaryl, and aralkyl hydrocarbyl radicals containing from 1 to 20 carbon atoms per radical, preferably from 1 to 10 carbon atoms per radical. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tracyclohexyloxide, titanium tetrabenzyloxide, titanium tetra-p-tolyloxide, and titanium tetraphenoxide.

Of the titanium tetrahydrocarbyloxides, titanium tetraalkoxides are preferred and titanium tetra-n-butoxide is particularly preferred because of the excellent results obtained employing this material.

The molar ratio of the chromium compound to the transition metal compound can be selected over a relatively broad range. Generally the molar ratio is within the range of about 0.001:1 to about 100:1, preferably from 0.005:1 to 50:1, more preferably from 0.01:1 to 20:1, and most preferably 0.1:1 to 2:1.

The chromium compound and the transition metal compound can be reacted in the presence of a liquid diluent or solvent. The chromium compound and the transition metal compound are normally mixed together in a suitable dry (essential absence of water) diluent or solvent, which is essentially inert to these components and the product produced. By the term "inert" is meant that the diluent does not chemically react with the dissolved components such as to interfere with the formation of the product or the stability of the product once it is formed. Such diluents include, for example, n-pentane, n-hexane, n-heptane, methylcyclohexane, toluene, and xylenes. Aromatic solvents are preferred, and toluene is most preferred.

Generally the amount of solvent or diluent employed can be selected over a broad range. Usually the amount of solvent or diluent is within the range of about 1 to about 100 cc per gram of chromium compound, preferably from 20 to 100 cc per gram.

The conditions for contacting the chromium compound and the transition metal compound can vary broadly and include a temperature and pressure sufficient to maintain the reaction mixture substantially in the liquid phase. The temperature is generally within the range of from about 0° C. to about 150° C., preferably from about 10° C. to about 100° C.

The pressure employed during contacting of the chromium compound and the transition metal compound does not appear to be a significant parameter and can vary broadly. Generally the pressure is within the range of about 1 psi to about 1000 psi, preferably 1 psi to 100 psi.

The time required for contacting the chromium compound and the transition metal compound will generally be within the range of from about 5 minutes to about 10 hours, although in most instances within the range of from 15 minutes to 3 hours is sufficient.

The cocatalysts suitable for use in accordance with the invention are organoaluminum compounds containing at least one hydrocarbyl radical, wherein each hydrocarbyl radical is individually selected from the group consisting of alkyl, cycloalkyl, aryl, alkaryl, and aralkyl hydrocarbyl radicals containing 1 to 20 carbon atoms per radical preferably 1 to 10 carbon atoms, and more preferably the hydrocarbyl radical is an alkyl radical.

Typical examples include trimethylaluminum, triethylaluminum, methylaluminum dibromide, ethylaluminum diiodide, dimethylaluminum chloride, diethylaluminum chloride, diisopropylaluminum chloride, diisobutylaluminum chloride, dodecylaluminum dibromide, dimethylaluminum bromide, methyl-p-propylaluminum bromide, di-n-octylaluminum bromide, dicyclohexylaluminum bromide, di-n-decylaluminum chloride, ethylisobutylaluminum chloride, diphenylaluminum chloride, dieicosylaluminum chloride, di-n-propylaluminum chloride, methylaluminum sesquibromide, ethylaluminum sesquiiodide, ethylaluminum sesquichloride, and mixtures thereof.

Based on higher catalyst productivity for producing polymer having a broad molecular weight distribution, organoaluminum halides are preferred. Of these compounds, chlorides are preferred and dialkylaluminum chlorides are especially preferred. Diethylaluminum chloride is readily available and has been employed with good results, and is the most preferred.

The molar ratio of the organoaluminum compound of the cocatalyst to the transition metal compound is not particularly critical and can be selected over a relatively broad range. Generally, the molar ratio of the organoaluminum compound of the cocatalyst to the transition metal compound is within a range of from about 0.1:1 to about 300:1, preferably from about 0.5:1 to about 150:1, and more preferably 1:1 to 100:1.

The polymerization process according to the present invention can be conducted in a solution phase process, in the presence or absence of an inert hydrocarbon diluent, in a particle form process, or in a gas phase process.

The polymerization process employing the catalysts and cocatalysts as above described can be performed either batchwise or continuously. In a batch process, for example, a stirred autoclave is prepared for use by first purging with an inert gas such as nitrogen and then with a suitable compound, such as isobutane for example. When the catalyst and cocatalyst are employed, either can be charged to the reactor first or they can be charged simultaneously through an entry port under an isobutane purge. After closing the entry port, hydrogen, if used, is added, and then a diluent, if used, is added to the reactor. The polymer can then be collected as a free-flowing white solid and dried to obtain the product.

In a continuous process, for example, a suitable reactor such as a loop reactor can be continuously charged with suitable quantities of solvent or diluent, catalyst, cocatalyst, polymerizable compounds and hydrogen, if any, and in any desirable order. The reactor product can be continuously withdrawn and the polymer recovered as appropriate, generally by flashing the diluent (solvent) and unreacted monomers and drying the resulting polymer.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having from 2 to 18 carbon atoms are most often used. The term polymerization is used herein to include both homo- and co-polymerization. In copolymerization other polymerizable monomers can be employed with the olefins. The preferred comonomers contain 4 to 10 carbon atoms, and 1-hexene is a particularly desirable comonomer because of cost, availability and efficacy.

Examples of suitable olefins include ethylene, propylene, 1-butene, 1-hexene, 4-methyl-1-pentene, and combinations thereof.

The present catalysts are particularly useful for the polymerization of ethylene homopolymers and copolymers and are especially well suited for preparing bimodal, broad molecular weight distribution polymers.

The polymerization reaction can be carried out in the presence of a diluent. Suitable as the diluent for the instant reaction system are inert hydrocarbons such as n-butane, isobutane, n-pentane, n-hexane, n-heptane, isooctane, cyclohexane, methylcyclohexane, benzene, toluene, zylene, tetralin, decalin, and other aliphatic, alicyclic, aromatic hydrocarbons, or mixtures thereof. The polymerization can be carried out in gas phase in the absence of diluent.

The catalysts of this invention can be employed in a batchwise, semi-continuous, or continuous polymerization process. Generally the present polymerization reaction can be carried out at a temperature in the range of about 0° C. to about 300° C., preferably in the range of about 25° C. to about 150° C., and more preferably from 25° C. to 100° C.

Polymerization pressure can vary depending on the type of monomer, the catalyst activity, the desired degree of polymerization, etc. Generally polymerization pressure can be subatmospheric or superatmospheric pressure up to about 300 atmospheres, preferably from atmospheric pressure to about 100 atmospheres, and more preferably from atmospheric pressure to 50 atmospheres.

Generally contacting time for the catalyst and the olefins can vary broadly from about 1 minute to about one week, more preferably from about 5 minutes to about 24 hours, and most preferably from 5 minutes to 5 hours.

Generally, when using a diluent in the instant polymerization reaction, it is convenient to introduce olefin into a mixture containing the catalyst of the present invention in the diluent. The catalyst composition can be added in its whole amount to the polymerization system at the start or it can be added portion-wise over the period for the polymerization.

In a batch process of polymerizing ethylene, for example, a stirred autoclave is conditioned by purging with dry nitrogen and then with the hydrocarbon diluent that is to be employed in the polymerization process such as isobutane, for example. Generally, although order is immaterial, the cocatalyst is charged through an entry port followed by the catalyst. After closing the port, hydrogen, if used, can be added, and the hydrocarbon diluent can then be charged.

The reactor can then be heated to the desired reaction temperature, e.g. about 20° C. to about 120° C., the ethylene admitted and maintained at a partial pressure within a range of about 0.5 to about 5.0 MPa (50–725 psig). At the end of the reaction period, generally about 1 hour for bench scale testing, the polymerization reaction is terminated by venting unreacted olefin and diluent. The reactor is then opened and the free-flowing white ethylene polymer can be collected and dried.

In a continuous process, for example, a suitable reactor such as a loop reactor is continuously charged with suitable quantities of diluent, catalyst, cocatalyst, olefin, and hydrogen, if used. The contact between the catalyst and monomer can be effected by various ways. For example, the olefin can be contacted with the catalyst in the form of a fixed bed, a slurry, a fluid bed, or a movable bed. Generally the loop reactor process is carried out at a temperature such that the resulting polymer is insoluble in the diluent, thus giving a slurry system. A continuous process is generally preferred in large scale commercial operations.

The polymerization reaction can be carried out in the presence of molecular hydrogen to regulate the molecular weight of the olefin polymers, as known in the art.

The reactor product is continuously or intermittently withdrawn, and the polymer recovered, e.g. flashing diluent and unreacted olefin and drying the product. In order to recover a produced polymer from the polymerization system, the crude polymerization product is for example taken up and subjected to flash separation, solvent extraction, hot filtration under a pressure, or centrifugal separation to yield a substantially pure polymeric product. A selection of the polymerization conditions for the process of the present invention, as well as the method for the recovery and purification of the polymeric product will be understood by those skilled in the art.

The olefin polymers made with the catalysts of this invention are useful in preparing articles by conventional polyolefin processing techniques such as injection molding, rotational molding, blow molding, and extrusion of film.

The following examples will serve to show the present invention in detail by way of illustration and not by way of limitation.

Example

The example demonstrates the effectiveness of a catalyst system comprising a homogeneous liquid catalyst comprising titanium tetrabutoxide and bis(cyclopentadienyl)chromium(II), and a cocatalyst, diethylaluminum chloride, for preparing a polymer with broad molecular weight distribution.

A catalyst solution was prepared by dissolving a predetermined amount of bis(cyclopentadienyl)chromium(II) and titanium tetrabutoxide in 5 mL toluene.

Polymerization reactions were conducted in a one-liter autoclave equipped with a stirrer and internal coils for temperature control. The reactor was charged with 500 mL dry cyclohexane after being purged with nitrogen. The reactor was charged with diethylaluminum chloride cocatalyst in the amount indicated in Table I, with the exception of Run 106 where triethylaluminum was employed. After stirring for 2 minutes, catalyst solution was added by syringe, in the amount indicated in Table I, followed by the addition of hydrogen at a partial pressure of 55 psig, except as noted in Runs 105-107 where no hydrogen was employed, and ethylene until the total reactor pressure reached 550 psig. The reactor was heated to the temperature designated in Table I and the reaction continued for 30 minutes. Weight average molecular weight (Mw) and number average molecular weight (Mn) were determined by GPC. All samples were corrected for a low molecular weight contaminant believed to be an oil. The results are summarized in Table I.

Terms used in the table below are defined as follows:
Cr is the concentration of bis(cyclopentadienyl)Cr employed as catalyst in mmol/L
Ti is the concentration of titanium tetrabutoxide employed as catalyst in mmol/L
Al is the concentration of diethylaluminum chloride employed as cocatalyst in mmol/L
T is polymerization temperature in °C. Productivity is grams polyethylene per g Ti
HI is heterogeneity index and is the ratio of Mw/Mn.

TABLE I

| Run | Cr mmol | Ti mmol | Al mmol | T °C. | Productivity g PE/ g Ti | Mw | HI |
|---|---|---|---|---|---|---|---|
| 101 | 0 | 0.04 | 1.2 | 50 | 49,000 | 634,000 | 13.7 |
| 102 | 0 | 0.04 | 1.2 | 80 | 61,000 | 362,000 | 10.7 |
| 103 | 0.05 | 0 | 3.0 | 50 | no solid | — | — |
| 104 | 0.05 | 0 | 3.0 | 80 | no solid | — | — |
| 105** | 0.2 | 0.2 | 0 | 50 | no solid | — | — |
| 106** | 0.2 | 0.2 | 6.0* | 50 | 180 | — | — |
| 107** | 0.2 | 0.2 | 6.0 | 50 | 1200 | — | — |
| 108 | 0.05 | 0.2 | 6.0 | 50 | 13,000 | 391,000 | 21.3 |
| 109 | 0.05 | 0.2 | 6.0 | 80 | 8,000 | 128,000 | 21.8 |

*TEA as aluminum cocatalyst
**No hydrogen used
— Not determined

The results in the table demonstrate that polymers produced employing a catalyst system comprising a cyclopentadienyl chromium compound and a titanium tetraalkoxide catalyst, and an organoaluminum halide cocatalyst exhibit a broad molecular weight distribution, Runs 108 and 109. GPC results for runs 108 and 109 also indicated a strong bimodal molecular weight distribution. No solid product was formed in runs 103–105. Runs 106 and 107 were run under the same conditions and demonstrate the higher productivity of diethylaluminum chloride as cocatalyst compared to triethylaluminum.

That which is claimed is:

1. A olefin polymerization catalyst system comprising a catalyst and a cocatalyst;
wherein said catalyst comprises a chromium compound and a transition metal compound,
wherein said chromium compound is represented by the formula

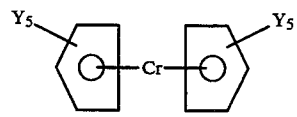

wherein each Y is individually selected from the group consisting of hydrogen and alkyl radicals containing from 1 to 20 carbon atoms;

wherein said transition metal compound is a titanium hydrocarbyloxide represented by the formula Ti(OR)$_4$ wherein each R is individually selected from the group consisting of alkyl, cycloalkyl, aryl, alkaryl, and aralkyl hydrocarbyl radicals containing from 1 to 20 carbon atoms per radical; and wherein said cocatalyst is an organoaluminum halide containing at least one hydrocarbyl radical individually selected from the group consisting of alkyl, cycloalkyl, aryl, alkaryl, and aralkyl hydrocarbyl radicals containing from 1 to 20 carbon atoms per radical.

2. A catalyst system according to claim 1 wherein Y in said chromium compound is selected from the group consisting of hydrogen and alkyl radicals containing from 1 to 10 carbon atoms.

3. A catalyst system according to claim 2 wherein Y in said chromium compound is selected from the group consisting of hydrogen and alkyl radicals containing from 1 to 6 carbon atoms.

4. A catalyst system according to claim 1 wherein said hydrocarbyloxide radical in said transition metal compound contains from to 10 carbon atoms.

5. A catalyst system according to claim 4 wherein said hydrocarbyloxide radical in said transition metal compound is an alkoxide radical.

6. A catalyst system according to claim 1 wherein said cocatalyst is an organoaluminum chloride.

7. A catalyst system according to claim 1 wherein said hydrocarbyl radical in said cocatalyst contains from 1 to 10 carbon atoms.

8. A catalyst system according to claim 7 wherein said hydrocarbyl radical is an alkyl radical.

9. A catalyst system according to claim 8 wherein said cocatalyst is a dialkylaluminum chloride.

10. A catalyst system according to claim 1 wherein the molar ratio of said chromium compound to said transition metal compound is in the range of from about 0.001:1 to about 100:1.

11. A process for the polymerization of olefin monomers comprising contacting said monomers under polymerization conditions with the catalyst system of claim 1.

12. An olefin polymerization catalyst system comprising a catalyst and a cocatalyst,
wherein said catalyst comprises a chromium compound and a transition metal compound,
wherein said chromium compound is represented by the formula

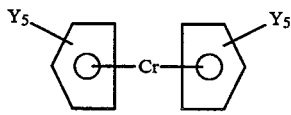

wherein each Y is individually selected from the group consisting of hydrogen and alkyl radicals containing from 1 to 6 carbon atoms;
wherein said transition metal compound is a titanium tetraalkoxide wherein each alkoxide is individually selected and contains from 1 to 10 carbon atoms; and wherein said cocatalyst is a dialkylaluminum chloride wherein each alkyl radical is individually selected and contains from 1 to 10 carbon atoms per radical.

13. A catalyst system according to claim 12 wherein said chromium compound is bis(cyclopentadienyl)-chromium(II).

14. A catalyst system according to claim 12 wherein said transition metal compound is titanium tetrabutoxide.

15. A catalyst system according to claim 12 wherein said cocatalyst is diethylaluminum chloride.

16. A process for the polymerization of olefin monomers comprising contacting said monomers under polymerization conditions with the catalyst system of claim 12.

17. A process according to claim 16 wherein said monomers comprise ethylene.

18. A process according to claim 17 wherein said contacting is conducted at a temperature in the range of from about 20° C. to about 120° C.

19. A catalyst system consisting essentially of a catalyst and a cocatalyst,
wherein said catalyst is a mixture of a chromium compound and a transition metal compound,
wherein said chromium compound is represented by the formula

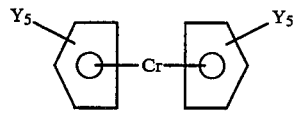

wherein each Y is individually selected from the group consisting of hydrogen and alkyl radicals containing from 1 to 6 carbon atoms;
wherein said transition metal compound is a titanium tetraalkoxide wherein each alkoxide is individually selected and contains from 1 to 10 carbon atoms; and
wherein said cocatalyst is a dialkylaluminum chloride wherein each said alkyl radical is individually selected and contains from 1 to 10 carbon atoms per radical.

20. A process for preparing a polymerization catalyst system comprising:
(1) contacting a chromium compound and a transition metal compound to form a catalyst, and
(2) contacting said catalyst and a cocatalyst to form said catalyst system;
wherein said chromium compound is represented by the formula

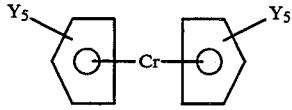

wherein each Y is individually selected from the group consisting of hydrogen and alkyl radicals containing from 1 to 20 carbon atoms;
wherein said transition metal compound is a titanium hydrocarbyloxide represented by the formula Ti(OR)$_4$ wherein each R is individually selected from the group consisting of alkyl, cycloalkyl, aryl, alkaryl, and aralkyl hydrocarbyl radical containing from 1 to 20 carbon atoms per radical; and wherein said cocatalyst is an organoaluminum halide containing at least one hydrocarbyl radical individually selected from the group consisting of alkyl, cycloalkyl, aryl, alkaryl, and aralkyl hydrocarbyl radicals containing from 1 to 20 carbon atoms per radical.

21. A process according to claim 20 wherein said contacting in step (1) is at a temperature and pressure sufficient to maintain the reaction mixture substantially in the liquid phase.

22. A process according to claim 21 wherein said contacting in step (1) is at a temperature in the range of from about 0° C. to about 150 C.

* * * * *

UNITED STATES PATENT AND TRADEMARK OFFICE
CERTIFICATE OF CORRECTION

PATENT NO. : 5,401,816

DATED : March 28, 1995

INVENTOR(S) : Henry L. Hsieh, Ted M. Pettijohn

It is certified that error appears in the above-identified patent and that said Letters Patent is hereby corrected as shown below:

Column 7, claim 4, line 27, after "from" insert therefor --- 1 ---.

Signed and Sealed this

Thirteenth Day of June, 1995

Attest:

BRUCE LEHMAN

Attesting Officer

Commissioner of Patents and Trademarks